(12) United States Patent
Dietrich

(10) Patent No.: US 8,674,572 B2
(45) Date of Patent: Mar. 18, 2014

(54) ADJUSTING DRIVE FOR AN ADJUSTABLE PART OF A PIECE OF FURNITURE

(75) Inventor: Michael Dietrich, Leubsdorf (DE)

(73) Assignee: Volker GmbH, Witten (DE)

( * ) Notice: Subject to any disclaimer, the term of this patent is extended or adjusted under 35 U.S.C. 154(b) by 245 days.

(21) Appl. No.: 12/962,131

(22) Filed: Dec. 7, 2010

(65) Prior Publication Data

US 2012/0139395 A1 Jun. 7, 2012

(51) Int. Cl.
*H02K 7/06* (2006.01)

(52) U.S. Cl.
USPC .................................. 310/83; 310/68 B; 74/25

(58) Field of Classification Search
USPC ................ 310/68 B, 83; 74/25, 89.39, 89.14; 188/180, 156, 162, 171
See application file for complete search history.

(56) References Cited

U.S. PATENT DOCUMENTS

| | | | | |
|---|---|---|---|---|
| 4,918,363 A | * | 4/1990 | Hollis et al. | 318/626 |
| 7,464,620 B2 | * | 12/2008 | Li et al. | 74/425 |
| 2009/0295258 A1 | * | 12/2009 | Caliendo et al. | 310/68 B |

* cited by examiner

*Primary Examiner* — Tran Nguyen
*Assistant Examiner* — Leda Pham
(74) *Attorney, Agent, or Firm* — Barnes & Thornburg LLP

(57) ABSTRACT

The adjusting drive for an adjustable part of a piece of furniture such as a hospital bed or nursing bed includes a housing, and a gear transmission arranged in the housing. The drive includes a rotatable drive element, a driven element, and a motor having a drive shaft for rotationally driving said drive element. The adjusting drive is further provided with a displacement sensor for detecting the position of said driven element. The drive element is arranged between two substantially opposite gears which are mechanically contacted by the drive element. The first gears is coupled to the driven element, and the second gear is coupled to said displacement sensor.

19 Claims, 8 Drawing Sheets

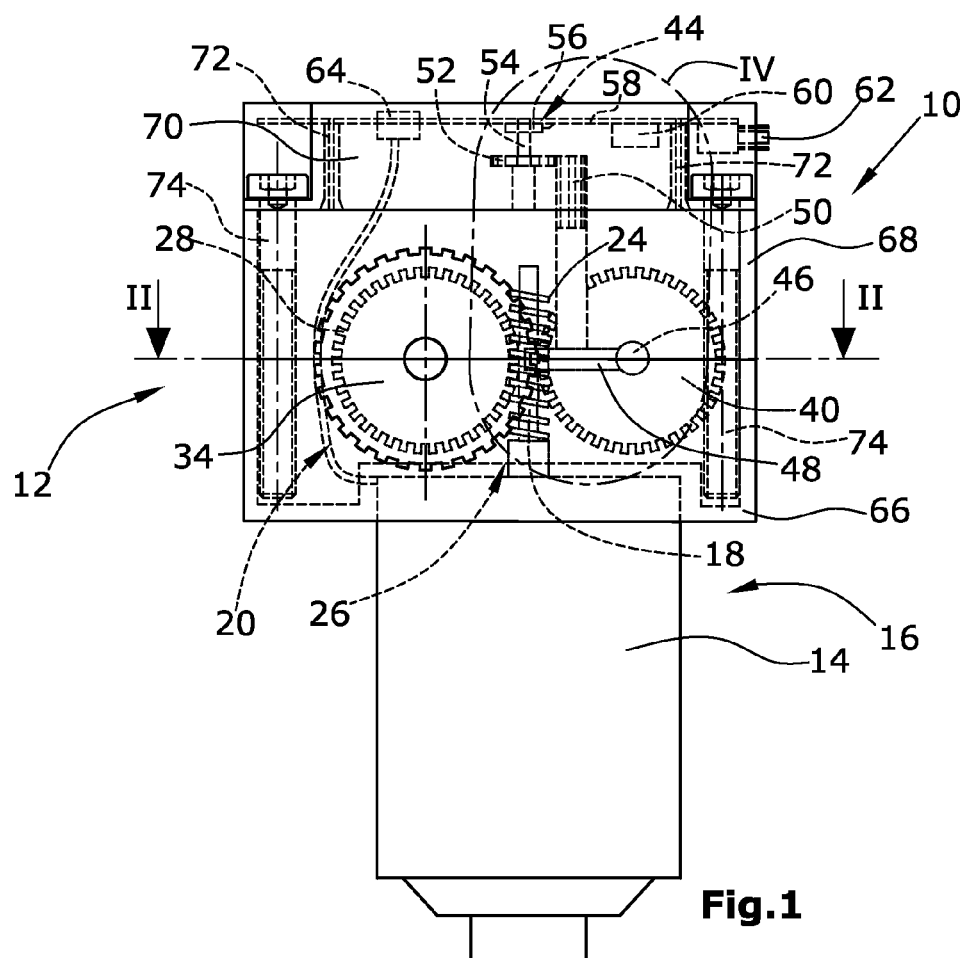
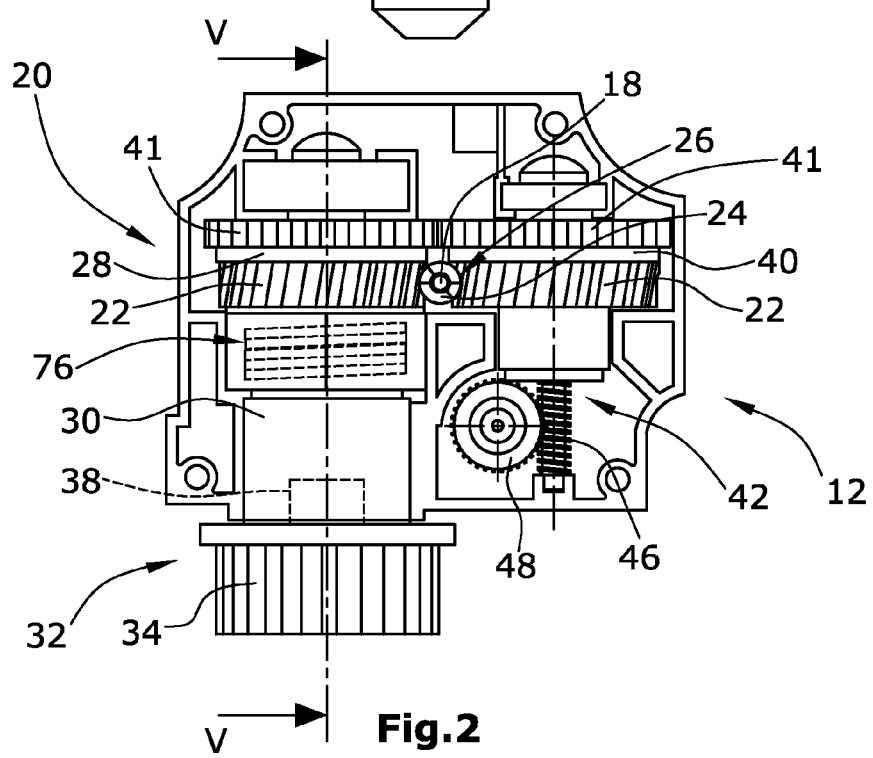

ADJUSTING DRIVE FOR AN ADJUSTABLE PART OF A PIECE OF FURNITURE

RELATED CROSS-REFERENCING

This application is related to European Patent Application 08166132.4, the disclosure of which is incorporated herein by reference.

BACKGROUND OF THE INVENTION

1. Field of the Invention

The present invention relates to an adjusting drive for an adjustable part of a piece of furniture, particularly for adjusting the height and/or the lying surface of a bed such as, e.g., a hospital bed or nursing bed.

2. Description of the Prior Art

Electrically adjustable pieces of furniture such as, e.g., height-adjustable tables, armchairs and chairs with seat and/or backrest adjustment, or also beds, particularly hospital beds or nursing beds with height and/or lying-surface adjustment will require very compact adjusting drives which need merely low maintenance, are easy to install and are functionally reliable. Examples of such adjusting drives are found in DE 296 96 367 U1, DE 20 2007 006 469 U1, DE 20 2007 005 308 U1, EP 1 400 726 A1, EP 0 662 573 B1 and DE 103 29 097 A1.

These known adjusting drives comprise a housing and a gear transmission arranged within the housing. Normally, said gear transmission comprises a rotatable, motor-driven drive element and a driven element adapted to be brought into operative connection with the adjustable part of a piece of furniture. Said drive element is normally driven by an electric motor whose drive shaft has the drive element connected to it for common rotation therewith.

For automatic control of a piece of furniture provided with several adjusting drives, as is the case e.g. in a hospital bed or nursing bed with height adjustment and/or lying-surface adjustment, it is of advantage under the aspect of wiring minimization if the individual adjusting drives are connected to a bus which is controlled e.g. by a central control unit. In addition to the adjusting drives, however, such a piece of furniture advantageously comprises also position or displacement sensors for indicating the current adjustment position of an adjusted part of the piece of furniture.

Also these displacement sensors are normally connected to said bus. Each unit connected to the bus requires a bus communication interface with corresponding electronics, resulting in undesired technical expenditure and complicating the bus protocol and the bus communication.

In view of the above, it is an object of the invention to provide an adjusting drive for an adjustable part of a piece of furniture, wherein the feedback of the position of the part to be adjusted by the adjusting drive is realized in a simple manner.

SUMMARY OF THE INVENTION

In accordance with the present invention, the above object is achieved by an adjusting drive for an adjustable part of a piece of furniture, particularly for adjusting the height and/or the lying surface of a bed such as, e.g., a hospital bed or nursing bed, said adjusting drive comprising a housing, a gear transmission arranged in said housing, said gear transmission comprising a rotatable drive element and a driven element adapted to be brought into operative connection with an adjustable part of a piece of furniture, a motor having a drive shaft for rotationally driving said drive element, and a displacement sensor for detecting the position of said driven element, said drive element being arranged between two substantially opposite gears mechanically contacted by the drive element, and the first gear being coupled to said driven element and the second gear being coupled to said displacement sensor (generally: being in operative connection with the drive element and the displacement sensor, respectively).

In the adjusting drive of the invention, comprising the features described above in the context of the state of the art, the drive element is arranged between two gears which are located substantially opposite to each other. The first of said two gears is coupled to the driven element (directly or, e.g. via a gear transmission, indirectly). When this first gear is being driven by the drive element while the driven element is subjected to a load, a rotational moment, oriented away from the gear, will act on the drive element and respectively the drive shaft of the motor. For continued maintenance of the engagement of the drive element with the first gear, the drive element is held in position by the second gear, i.e. as it were, in the manner of a counter-abutment, thus keeping up the mutual engagement between the drive element and the first gear. Accordingly, the second gear serves for taking up the above described rotational moments which will occur during a driving operation under load and will act on the drive element.

According to the invention, said second gear is used for operating a displacement sensor coupled (directly or indirectly) to the second gear. Said displacement sensor serves for detecting the (rotary) position of the driven element. Thus, in this manner, the second gear can be used for two purposes, which generally allows for a compact design of the adjusting drive. If such an adjusting drive is connected to a bus, a sole bus interface can be used for controlling the adjusting drive as well as for communicating, from the adjusting drive, the current position of the driven element. From this information, a superordinate unit can derive the current adjusting position of the adjustable part of the piece of furniture.

The displacement sensor is suitably provided in the form of a potentiometer and, in this case, particularly a rotary potentiometer. Potentiometers of this type are robust and will work reliably. By way of alternative to such displacement sensors of the resistive type, use can be made of displacement sensor designed for electrical, capacitive, inductive, optical or magnetic operation. The displacement sensor can be a relative displacement sensor or an absolute displacement sensor. The displacement sensor can also be provided in the form of a decoder.

To make it possible, with the aid of the adjusting drive of the invention, to move the adjustable part of a piece of furniture throughout its adjustment range, it will normally be required that the driven element performs a plurality of rotations about its own axis. Suitably, this multiple rotation of the driven element will be translated into less than one rotation of the displacement sensor or, put in more-general terms, into a comparatively short distance of the displacement sensor. Suitably, this purpose is served by a reduction gear stage of the adjusting drive that is also accommodated in the housing. Via said reduction gear stage, the second gear is coupled to a sensor element of the displacement sensor. Thus, in case of a potentiometer, the sliding contact will be moved by the second gear in a linear or rotary manner.

As already mentioned above, said drive element driven by the motor is arranged between two gears. In this arrangement, the drive element is suitably provided in the form of a worm. Alternatively, also the drive element itself can be formed as a gear.

In case that the drive element is formed as a worm, the two gears comprise e.g. a helical gearing arranged in engagement with the worm. Additionally, however, the two gears can comprise also further toothing structures by which the gears directly mesh with each other. This leads to an increased resistance of the coupling between the worm and the first gear in situations when the drive system is erroneously caused to "hit the limit", which is rendered possible by an increase of the moment of resistance offered to the worm by the gear.

To allow for a still more compact design of the adjusting drive of the invention, it is recommendable to arrange a bus communication unit and said displacement sensor (optionally with further electrical or electronic components) on a common circuit board which also is safely accommodated within the housing.

The driven element of the gear transmission of the adjusting drive is suitably provided in the form of a gear (e.g. for driving a toothed belt) or a spindle meshing with a spindle nut and forming a driven element arranged for linear displacement. It can also be envisioned to selectively connect the driven element to a toothed wheel or a spindle for common rotation therewith. This would increase the range of uses of the adjusting drive.

When a part of a piece of furniture is designed to be adjusted by an adjusting drive, a danger exists that load moments acting on the driven element in the switched-off state of the motor might cause a movement of the adjustable part of the piece of furniture. Normally, such an effect is undesirable. Thus, for instance, a backrest portion of the lying surface of a bed that has been adjusted to an oblique position should not unintentionally be allowed to readjust itself (back into a base position) when a person is lying in the bed. Primarily in hospital and nursing beds, such an occurrence must be prevented.

For eliminating this problem, the initially mentioned known adjusting drives are provided with load-moment stop devices which are operative to prevent that, in the switched-off state of the motor, the driven element might be caused to move under the influence of external moments. In this regard, it is generally known to use so-called claw brakes comprising helical brake springs arranged in a brake drum in a radially outward orientation and in a biased state. A brake of this type which will be automatically activated as soon as the driven element is subjected to rotational moments acting in the moving directions of the driven element, can be easily integrated into the adjusting drive of the invention. For this purpose, the adjusting drive suitably comprises a two-part shaft between the first gear and the driven element. Said two-part shaft is provided with a gear shaft coupled to the gear, and with a driven-element shaft coupled to the driven element. Both shaft parts are in engagement with each other via axially projecting claws so that, when the first gear and respectively the gear shaft are rotated, said driven-element shaft will be taken along. In order to prevent, however, that a rotational moment generated on the side of the driven element and acting on the driven-element shaft might lead to rotation of the driven-element shaft (which, after all, would cause an unintended readjustment of the furniture part to be driven by the adjusting drive), it is provided that the brake comprises a brake drum with a helical brake spring arranged therein, both parts being arranged around said two-part shaft the region of the mutually engaged claws. Said helical brake spring is on both of its ends provided with radially inwardly projecting entrainment arms which extend between two claws of the two shaft parts, which claws follow each other in the circumferential direction. This arrangement is configured in such a manner that the entrainment of one of said entrainment arms by a claw of the gear shaft (depending on the rotational direction of the gear shaft, its claw will entrain one entrainment arm or the other entrainment arm of the helical brake spring) will result in a radial contraction of the helical brake spring, which has the consequence that the radially acting press-on force by which the helical brake spring adheres to the brake drum from the inside, will be reduced, and that the helical brake spring can rotate within the brake drum (normally in abutment on the brake drum). However, in case that, conversely, one of the entrainment arms of the helical brake spring is entrained by the claw, or one of the claws, of the driven-element shaft, the helical brake spring is subjected to a moment widening the spring still further, with the consequence that the helical brake spring will be pressed onto the brake drum from the inside with increasing force, thus generating the brake effect. The advantage of the helical brake spring resides in its functional reliability and its compact design, allowing the spring to be advantageously combined with the adjusting drive of the invention.

According to an advantageous embodiment of the invention, it is further provided that the housing is of a three-part configuration, comprising a first housing member to which the motor is fastened, with its drive shaft extending into said first housing member; a second housing member adapted to be connected to said first housing member and being open on two opposite sides; and a lid closing said second housing member. Said lid and said first and second housing members are connected to each other by connection elements extending between the lid and the first housing member as well as through the second housing member.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which FIG. 1 is a lateral view of an embodiment of the adjusting drive with schematically shown inner configuration of the gear transmission and of the displacement sensor;

FIG. 2 is a view of the adjusting drive, as seen along the line II-II in FIG. 1, with the upper housing member removed, the driven element being shown in FIG. 2 in the form of a gear;

DETAILED DESCRIPTION OF PREFERRED EMBODIMENTS

Figure 3:
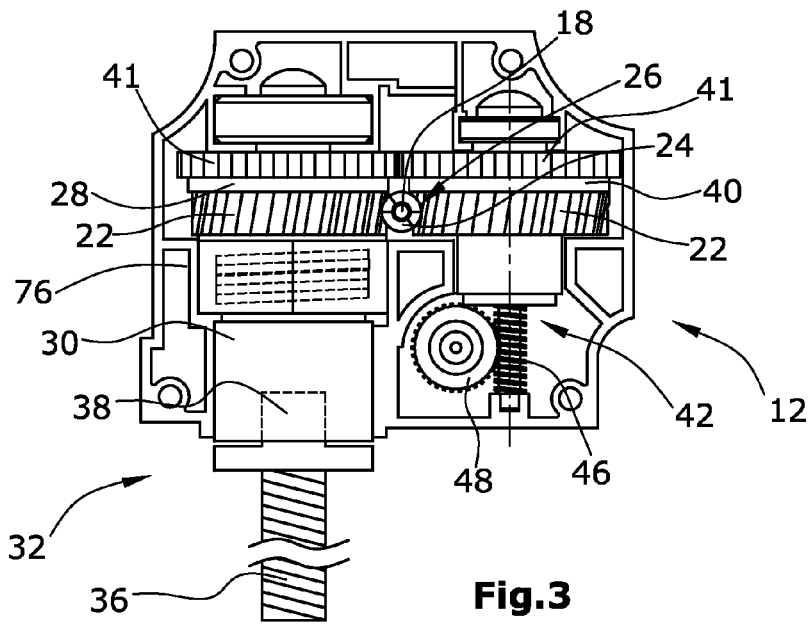
FIG. 3 is a view of an alternative configuration of the adjusting drive as seen along the line II-II in FIG. 1, the driven element being shown in FIG. 3 in the form of a spindle for a spindle drive.

In FIGS. 1 to 5, there is shown the constructional design of an embodiment of the adjusting drive 10 of the invention. The adjusting drive 10 comprises a housing 12 which in the present embodiment is of a three-part configuration. Tightly connected to said housing 12 is the housing 14 of an electric motor 16. Said electric motor 16 comprises a drive shaft 18 extending into housing 12.

Internally of housing 12, a gear transmission 20 is arranged which comprises a drive element 26 provided in the form of a worm 24 and connected to motor shaft 18 for common rotation therewith, and which further comprises a first gear 28 arranged in engagement with said drive element.

Said first gear 28 is connected to a driven element 32 via a shaft 30. In the illustrated embodiment as shown in FIG. 2, said driven element 32 is realized as a gear 34, e.g. for driving a toothed belt. In FIG. 3, by way of alternative, said driven element 32 is shown as a spindle 36. Advantageously, both driven elements can be connected to said shaft 30 for common rotation therewith. For this purpose, use is made of a coupling schematically indicated in FIGS. 2 and 3, which is designed as a polygonal pin with complementary square recess. However, it can also be provided that said gear 34 and respectively said spindle 36 are permanently attached to shaft 30 and thus cannot be removed.

Apart from said first gear 28 of gear transmission 20, housing 12 includes a second gear 40 which again is rotationally driven by said drive element 26 (worm 24) (cf. the first toothing arrangements 22). Both gears comprise a toothing arrangement 41 by which they directly mesh with each other. The second gear 40 is a part of a (reduction) gear transmission stage 42 for operating a displacement sensor 44 comprising a sensor element 45.

Relative to the position of drive element 26, said second gear 40 is arranged opposite to said first gear 28. Thus, in other words, drive element 26 is arranged directly between the two gears 28 and 40. Second gear 40 will support the drive element 26 when the latter is subjected to rotational moments or rotational moment components which are directed to an increased extent towards drive shaft 18 and away from first gear 28, such as is the case particularly when the adjusting drive is running under load conditions. Thus, the second gear 40 will lend support to the drive shaft 18 and respectively the drive element 26 (worm).

Apart from the above function, however, the second gear 40 additionally serves for operating the displacement sensor 44. In this regard, it is relevant that second gear 40 is a part of gear stage 42 and is arranged on a common shaft with a worm 46 which in turn drives a gear 48 arranged on a common shaft with a smaller-diameter gear 50. The latter gear 50 in turn drives a further gear 52 whose shaft will finally actuate the sensor 45. In this embodiment, displacement sensor 44 is designed as a rotary potentiometer 56.

Rotary potentiometer 56 is arranged on a circuit board 58 which inter alia comprises a bus communication unit 60 and further electrical or electronic components. The electric supply and control of adjusting drive 10 is performed via a plug 62 whose connectors are accessible from outside of the housing. Via a further plug 64, circuit board 58 is electrically connected to engine 16.

With the aid of bus communication unit 60, the adjusting drive 10 can be controlled via a bus line. Said bus line can have a plurality of adjusting drives 10 connected to it. In this manner, for instance, all adjusting drives mounted to a piece of furniture can be controlled via a sole bus communication line. Thereby, the wiring expenditure is reduced, which results in an improvement of the quality since the reduction of connections in the cable tree will also decrease the risk of failure. Further, the use of bus communication units and the connection of the adjusting drives to a bus will allow for a reduction of the number of plugs and the number of plug types and sizes, since the all of the mounted adjusting drives are connected via uniform plug connections. Further, the adjusting drive itself can be standardized, or use can be made of standardized adjusting drives. Also the diagnostic capability of all adjusting drives can be achieved in a simple manner in that, by means of a diagnostic testing device, all the adjusting drives and other components connected to the bus can be subjected to testing. This will facilitate the process of checking for errors so that the errors can also be eliminated sooner.

Figure 4:
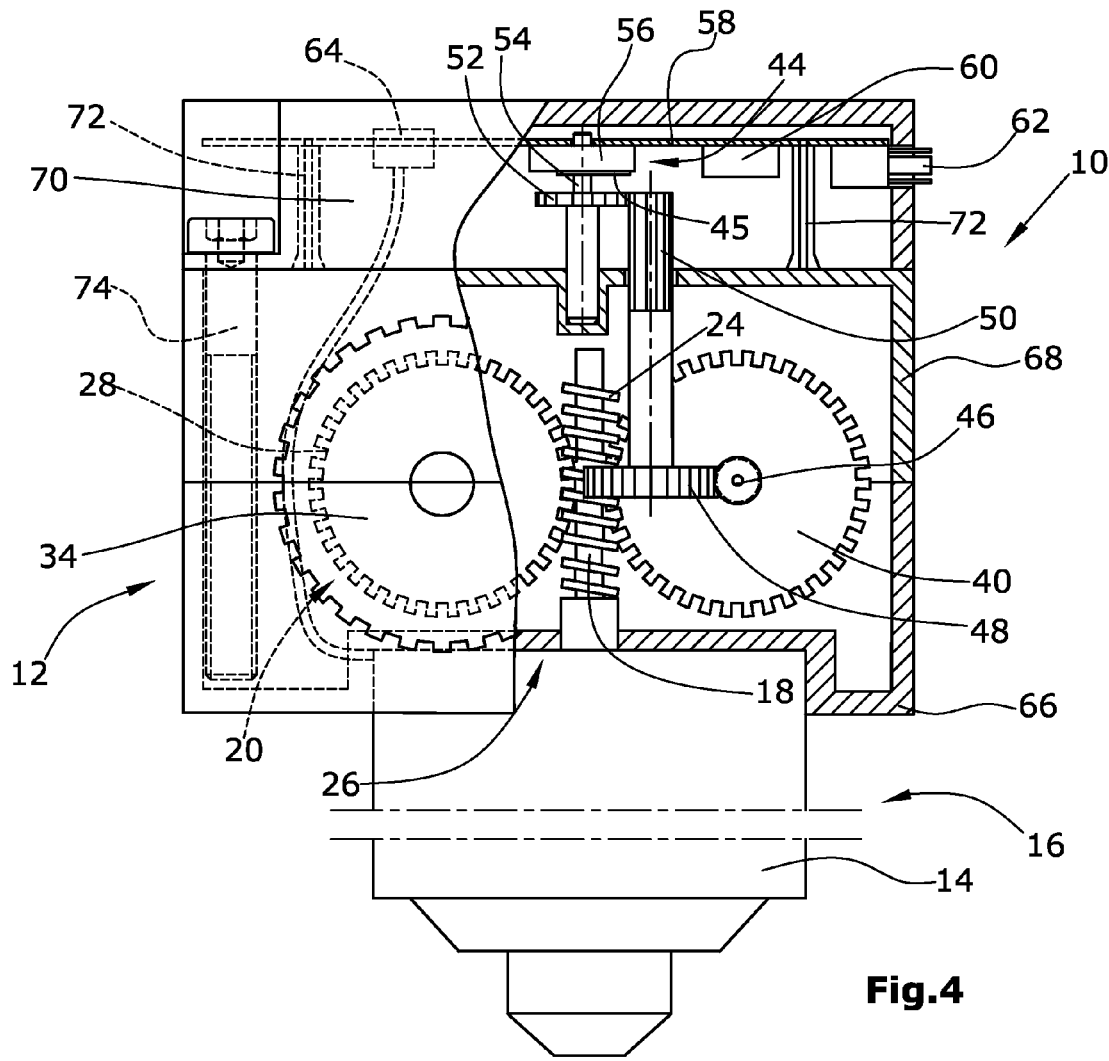
FIG. 4 is an enlarged view of FIG. 1, with the housing left out in the region marked by IV in FIG. 1 for enhanced representation of the gear transmission stage for the displacement sensor and of the arrangement of the displacement sensor on a circuit board with bus communication electronics and further electronics.
Figure 5:
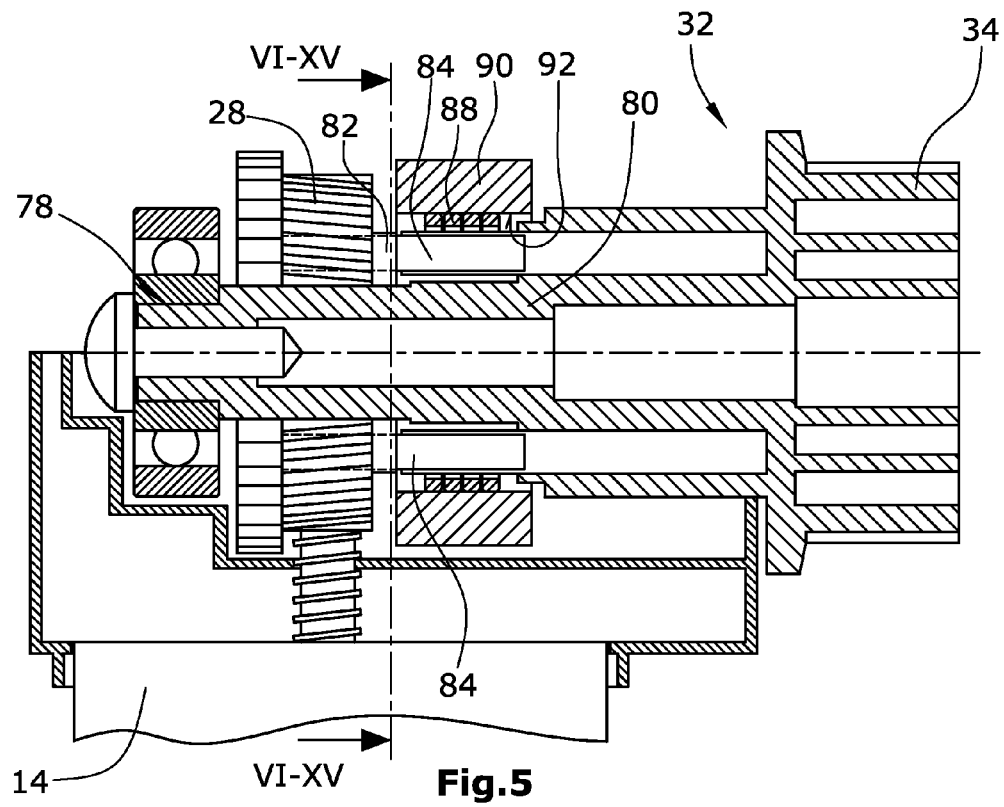
FIG. 5 is a sectional view as seen along the line IV-IV in FIG. 2 for enhanced representation of the configuration of the claw brake.

FIGS. 1 and 4 also show the three-part design of housing 12. The housing comprises a first housing member 66 with the housing 14 of motor 16 attached thereto. First housing member 66 is followed by a second housing member 68. Supported between these two housing members are the gears 28,40 and the shaft 30 connecting the first gear 28 to driven element 32. Also parts the gear transmission stage 42 for the rotary potentiometer 56 are supported between the two housing members 66,68.

On the side of second housing member 68 opposite first housing member 66, a lid 70 is arranged, covering the circuit board 58 held by upright pins 72 of second housing member 68. Said three housing members are tightly connected to each other in a fluid- and splash-proof manner by throughgoing screws 74.

Finally, also a brake 76 is arranged in the housing 12 of drive unit 10. Said brake 76 serves as a load-moment stop device to prevent that, in the switched-off state of motor 16, the driven element 32 might rotate when subjected to rotational moments as caused e.g. by external loads. Brake 76 is actuated via shaft 30. Shaft 30, operable to act on driven element 32 for transmission of the rotational movement of first gear 28 onto driven element 32, is of a two-part design and comprises a driven-element shaft 80 rotationally supported at 78 in housing 12, and a gear shaft 82, wherein, in this embodiment, first gear 28 is rotationally supported on driven-element shaft 80. Said driven-element shaft 80 and said gear shaft 82 are each provided with two mutually opposite, axially projecting claws 84,86 which are in mutual engagement with each other whereby, when the first gear 28 is rotated, also the driven-element shaft 80 is rotated along with it. The mutual engagement of said claws 84 and 86 shown in FIGS. 6 to 15.

Arranged around said claws 84 and 86 is a helical brake spring 88 having a plurality of windings, which, while radially biased to the outside, is located in a brake drum 90 and is arranged in forced abutment on the inner peripheral side 92 of brake drum 90. Said helical brake spring 88 is on each of its ends provided with a radially inwardly directed entrainment arm 94,96. The distance between said two entrainment arms 94,96 in the circumferential direction of helical brake spring 88 when viewed in the axial direction of the latter (see e.g. FIG. 6) is selected such that one of the two claws 84 of gear shaft 82, i.e. one of the two claws 84 on the drive side, extends axially between the entrainment arms 94,96. In other words, on both sides of said drive-side claw 84, the two entrainment arms 94,96 project into the spaces between this claw 84 and the respective adjacent driven-side claws 86, as illustrated e.g. in FIG. 6.

The brake drum 90 is accommodated in a recess 98 of first housing member 66 for common rotation therewith. For this purpose, brake drum 90 comprises e.g. a hexagonal outer contour. Brake drum 90 is suitably made of a metallic material, which also is the case for helical brake spring 88.

With reference to FIGS. 6 to 11, it will be briefly explained hereunder how, when the first gear 28 is driven by motor 16, the helical brake spring 88 will be entrained within brake drum 90 together with the first gear 28 and respectively with the drive-side claws 84. In this regard, it is not relevant in which direction the first gear 28 is rotating.

Figure 6:
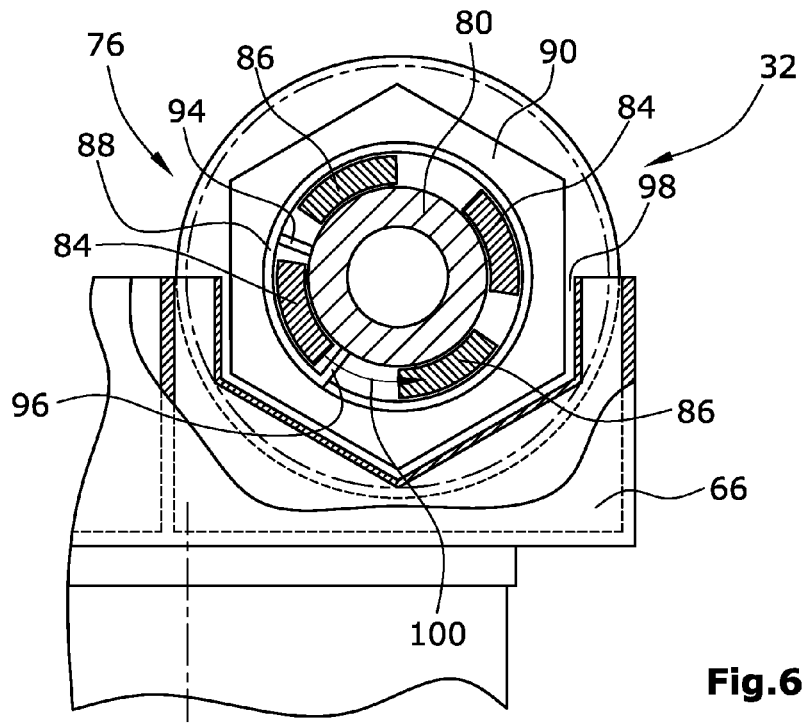
FIGS. 6 to 8 and 9 to 11 are sectional views as seen along the line VI-XV in FIG. 5 for enhanced representation of the releasing of the claw brake when the gear driven by the engine for driving the driven element is moved in one of the two opposite directions.
Figure 7:
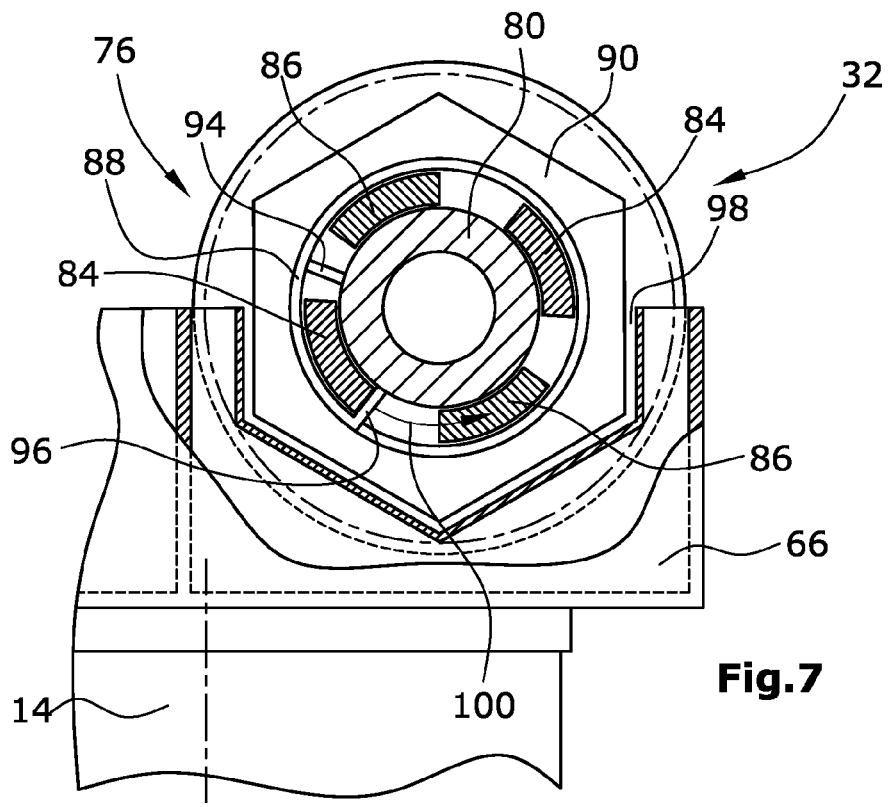
Figure 8:
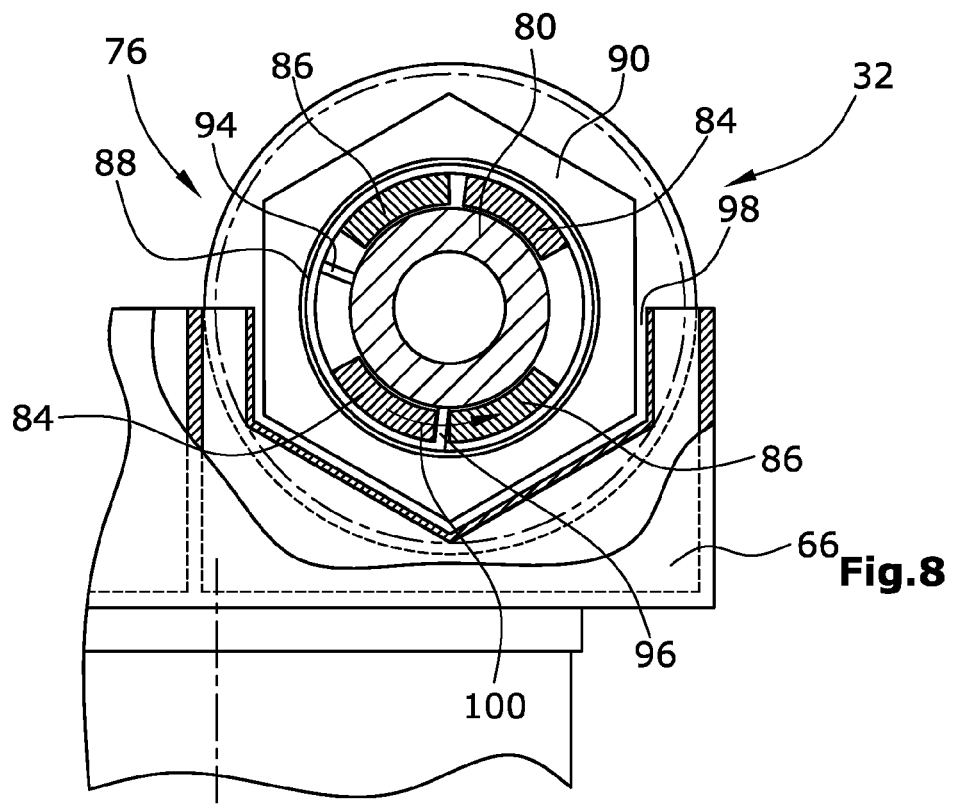
Figure 9:
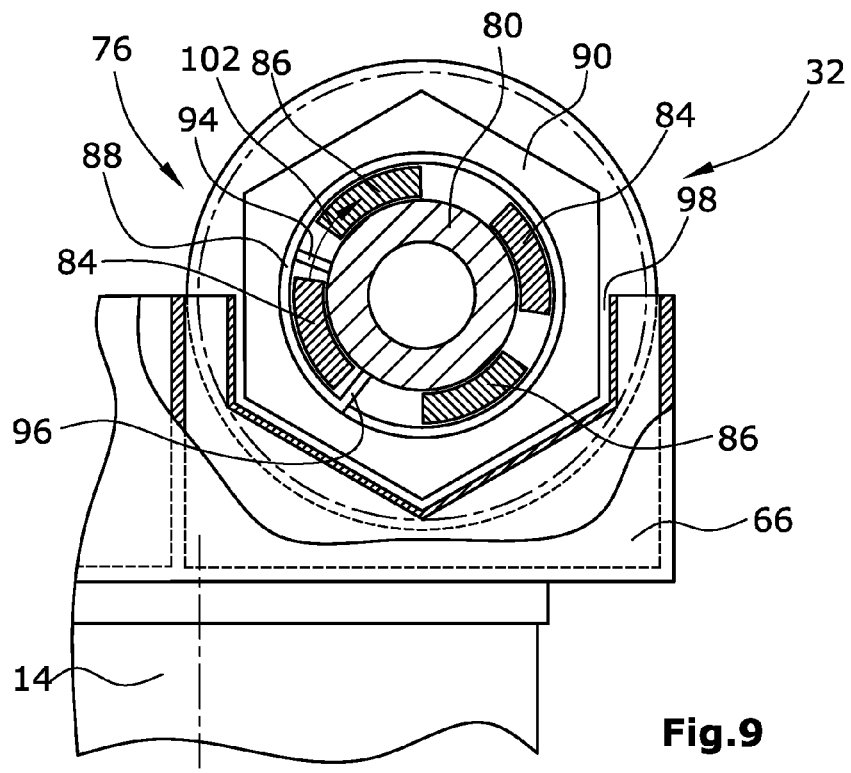
Figure 10:
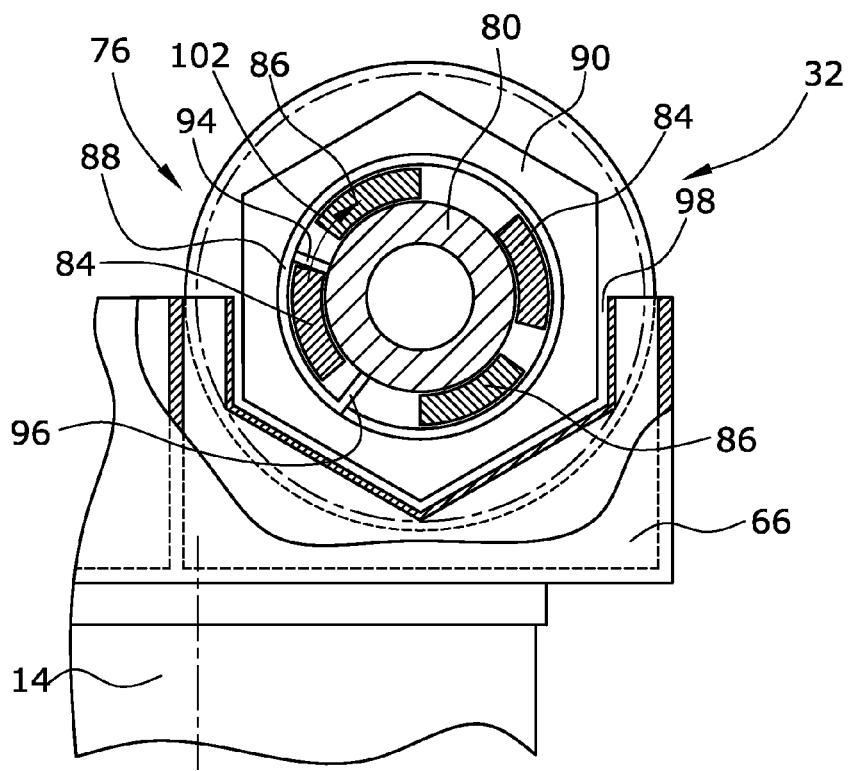
Figure 11:
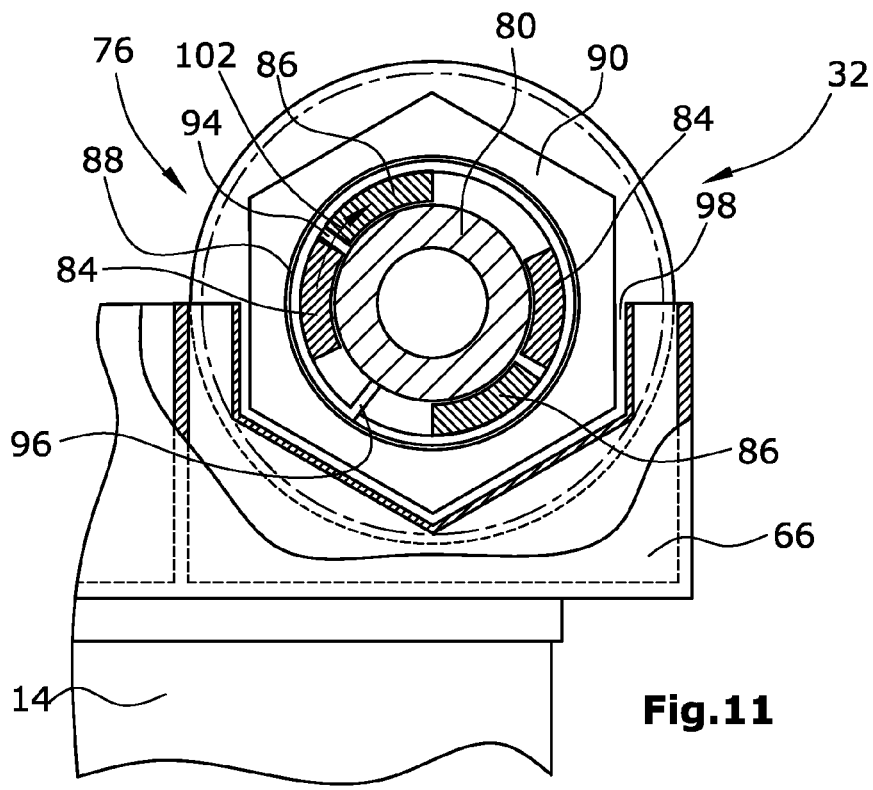

FIG. 6 shows the initial situation out of which the drive-side claws 84 will rotate in the direction marked by arrow 100. The drive-side claw 84 arranged between the two entrainment arms 94 and 96 will get into contact with the entrainment arm 96 of the helical brake spring 88 (see FIG. 7), which during further movement of claw 84 will lead to a constriction of helical brake spring 88 so that the latter will be rotationally entrained and, as a result, the drive-side claws 84 will get into contact with driven-side claws 86, thus causing the driven element 32 to be rotationally entrained. The situation during rotation of the first gear 28 in the opposite direction (see directional arrow 102) is depicted in FIGS. 9 to 11.

Now, if in the switched-off state of the engine 16, a rotational moment is acting on the driven element 32, rotation of driven element 32 must be prevented. In this case, brake 76 will be activated, which is irrespective of the rotational direction in which the rotational moment acts on the driven element 32.

Figure 12:
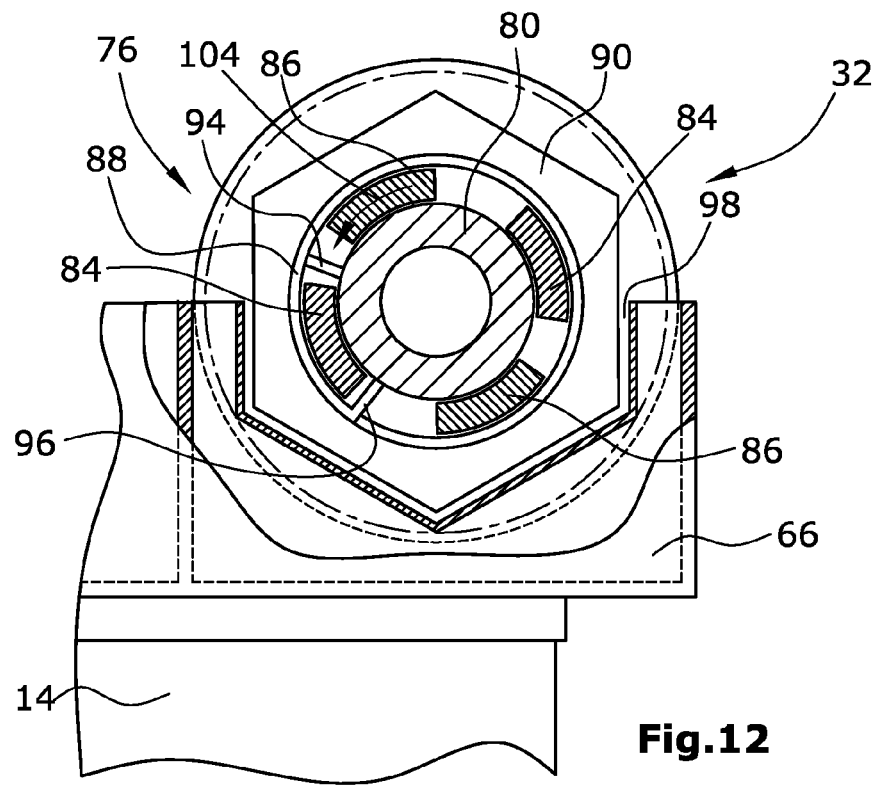
FIGS. 12 and 13, and 14 and 15 are sectional views as seen along the line VI-XV in FIG. 5 for enhanced representation of the automatic braking effect of the claw brake for cases where the driven element is moved into one of its two moving directions on the driven side, i.e. from the outside, which can occur e.g. under the influence of load moments acting on a part of a piece of furniture that is to be adjusted by the adjusting drive.
Figure 13:
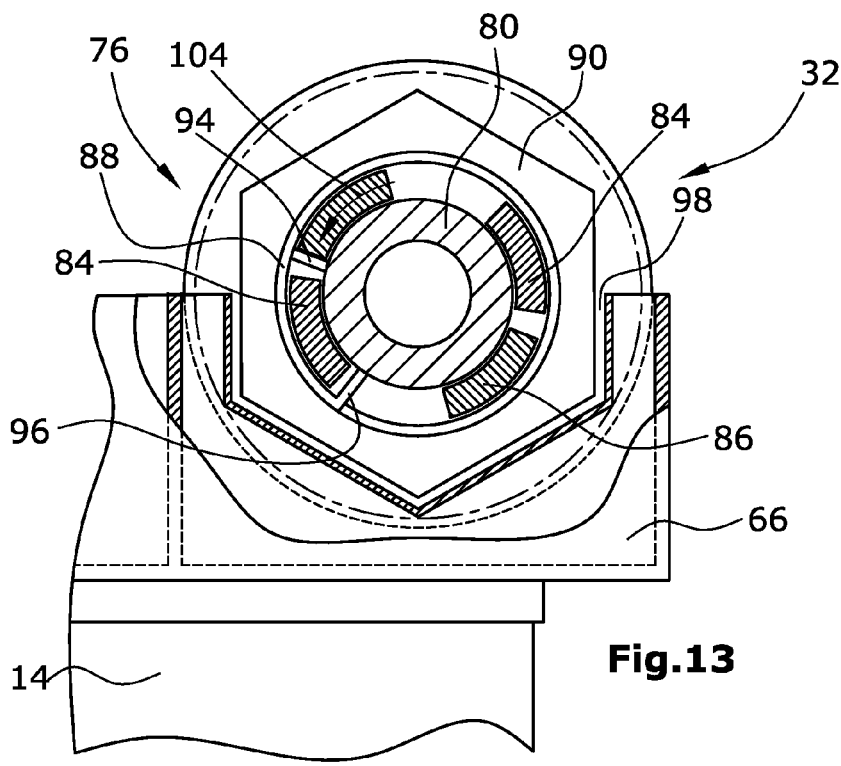
Figure 14:
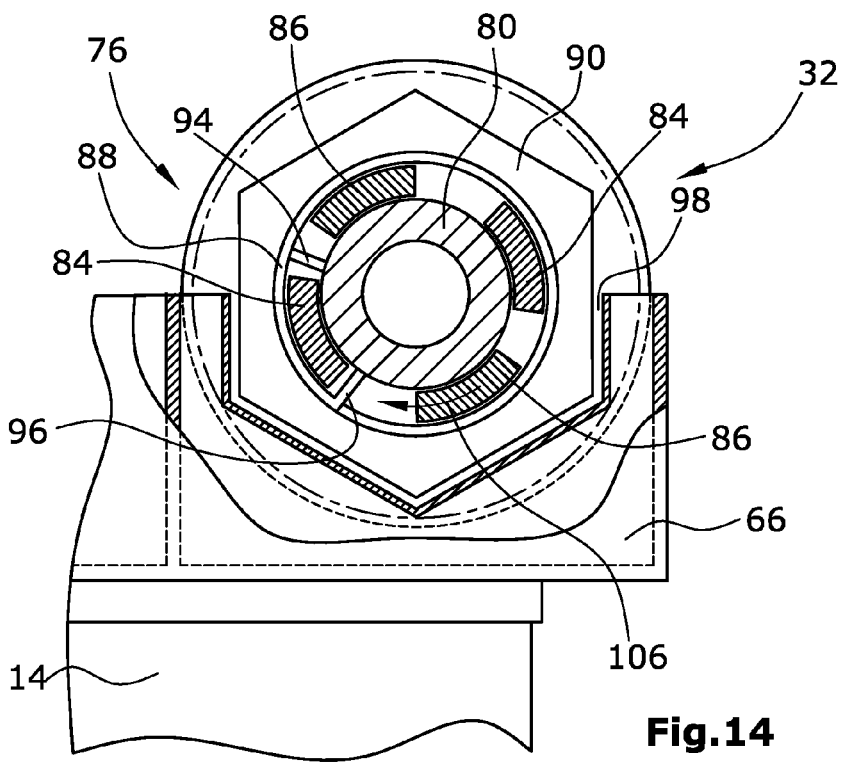
Figure 15:
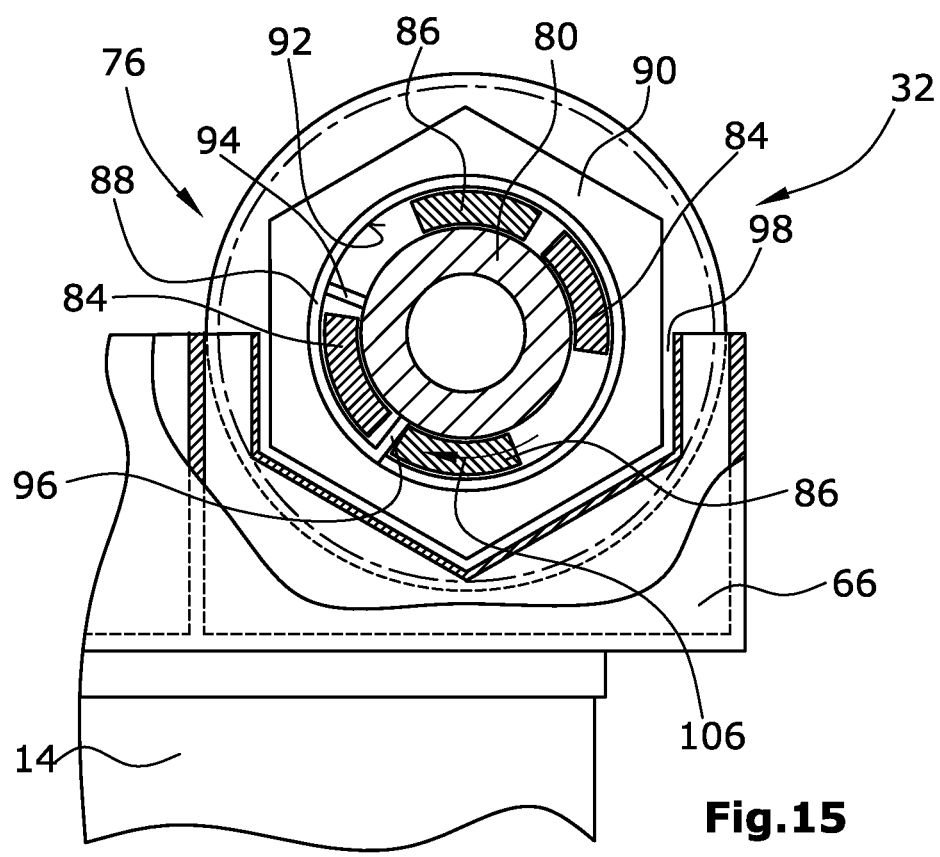

FIGS. 12 and 13 show the case where the driven element 32 is rotated in the direction of arrow 104. Already after a brief time, this rotation will cause one of the two driven-side claws 86 to get into contact with one of the two entrainment arms 94,96. This situation is shown in FIG. 13 where one of the two driven-side claws 86 is getting into contact with the entrainment arm 96 of the helical brake spring 88. Upon further rotation of claw 86, this claws—via entrainment arm 96—will press the helical brake spring 88 ever more strongly against the inner peripheral side 92 of brake drum 90, thus reliably preventing a rotation of helical brake spring 88 within brake drum 90. In this manner, driven element 32 will have been braked. The same situation will be achieved if, as indicated in FIGS. 14 and 15, the driven element 32 is rotated in the other direction (see directional arrow 106). Similar to the above described case, one of the two driven-side claws 86 will move into contact with the other entrainment arm 96 of helical brake spring 88.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. An adjusting drive for an adjustable part of a piece of furniture, particularly for adjusting the height and/or the lying surface of a bed such as, e.g., a hospital bed or nursing bed, said adjusting drive comprising
 a housing,
 a gear transmission arranged in said housing, said gear transmission comprising a rotatable drive element and a driven element adapted to be brought into operative connection with an adjustable part of a piece of furniture,
 a motor having a drive shaft for rotationally driving said drive element, and
 a displacement sensor for detecting the position of said driven element,
 said drive element being arranged between two substantially opposite gears mechanically contacted by the drive element, and
 a first gear being coupled to said driven element and a second gear being coupled to said displacement sensor,
 wherein the gears each comprise a first toothing arrangement meshing with the drive element, and a second toothing arrangement causing the two gears to mesh directly with each other.

2. The adjusting drive according to claim 1, wherein the displacement sensor comprises a movable sensor element and the second gear is a part of a reduction gear stage for moving said sensor element of the displacement sensor.

3. The adjusting drive according to claim 1, wherein the displacement sensor is a relative or absolute displacement sensor, particularly of the type for electrical, capacitive, inductive, resistive, optical or magnetic operation.

4. The adjusting drive according to claim 1, wherein the displacement sensor is a potentiometer.

5. The adjusting drive according to claim 1, wherein the drive element arranged between the two gears is a worm.

6. The adjusting drive according to claim 1, wherein a bus communication unit for controlling the motor via a bus system is arranged within or on the housing.

7. The adjusting drive according to claim 1, wherein a circuit board with electrical/electronic components is arranged in the housing, said circuit board having the displacement sensor being arranged on it.

8. The adjusting drive according to claim 1, wherein the housing is of a three-part configuration and comprises a first housing member having the motor externally fastened thereto, with the drive shaft of the motor extending into said first housing member, a second housing member adapted to be connected to said first housing member and being open on two opposite sides, and a lid closing said second housing member, said lid. and said first and second housing members being connected to each other by connection elements extending between the lid and the first housing member as well as through the second housing member.

9. An adjusting drive for an adjustable part of a piece of furniture, particularly for adjusting the height and/or the lying surface of a bed such as, e.g., a hospital bed or nursing bed, said adjusting drive comprising
 a housing,
 a gear transmission arranged in said housing, said gear transmission comprising a rotatable drive element and a driven element adapted to be brought into operative connection with an adjustable part of a piece of furniture,
 a motor having a drive shaft for rotationally driving said drive element, and
 a displacement sensor for detecting the position of said driven element,
 said drive element being arranged between two substantially opposite gears mechanically contacted by the drive element, and a first gear being coupled to said driven element and a second gear being coupled to said displacement sensor, wherein a two-part shaft is arranged between the first gear and the driven element, said two-part shaft comprising a gear shaft coupled to said gear, and a driven-element shaft coupled to the driven element, wherein the two shaft parts comprise axially projecting and mutually engaging claws for rotational entrainment of said driven-element shaft by said gear shaft, and wherein, around said claws, a brake drum is positioned, said brake drum comprising a helical brake spring arranged therein and pressing from inside against the brake drum, said helical brake spring being on both of its ends provided with radially inwardly projecting entrainment arms each extending between the claws of the gear shaft and of the driven-element shaft.

10. The adjusting drive according to claim 1, wherein the driven element comprises a gear or a spindle, or a recess for receiving a gear or a spindle for common rotation therewith.

11. The adjusting drive according to claim 9, wherein the displacement sensor comprises a movable sensor element and the second gear is a part of a reduction gear stage for moving said sensor element of the displacement sensor.

12. The adjusting drive according to claim 9, wherein the displacement sensor is a relative or absolute displacement sensor, particularly of the type for electrical, capacitive, inductive, resistive, optical or magnetic operation.

13. The adjusting drive according to claim 9, wherein the displacement sensor (44) is a potentiometer.

14. The adjusting drive according to claim 9, wherein the drive element arranged between the two gears is a worm.

15. The adjusting drive according to claim 9, wherein the gears each comprise a first toothing arrangement meshing with the drive element, and a second toothing arrangement causing the two gears to mesh directly with each other.

16. The adjusting drive according to claim 9, wherein a bus communication unit for controlling the motor via a bus system is arranged within or on the housing.

17. The adjusting drive according to claim 9, wherein a circuit board with electrical/electronic components is arranged in the housing, said circuit board having the displacement sensor being arranged on it.

18. The adjusting drive according to claim 9, wherein the housing is of a three-part configuration and comprises a first housing member having the motor externally fastened thereto, with the drive shaft of the motor extending into said first housing member, a second housing member adapted to be connected to said first housing member and being open on two opposite sides, and a lid closing said second housing member, said lid and said first and second housing members being connected to each other by connection elements extending between the lid and the first housing member as well as through the second housing member.

19. The adjusting drive according to claim 9, wherein the driven element comprises a gear or a spindle, or a recess for receiving a gear or a spindle for common rotation therewith.

* * * * *